(12) United States Patent
Perlman

(10) Patent No.: US 8,488,782 B2
(45) Date of Patent: Jul. 16, 2013

(54) PARAMETERIZABLE CRYPTOGRAPHY

(75) Inventor: Radia J. Perlman, Redmond, WA (US)

(73) Assignee: Oracle America, Inc., Redwood Shores, CA (US)

(*) Notice: Subject to any disclaimer, the term of this patent is extended or adjusted under 35 U.S.C. 154(b) by 796 days.

(21) Appl. No.: 12/582,276

(22) Filed: Oct. 20, 2009

(65) Prior Publication Data

US 2011/0093721 A1 Apr. 21, 2011

(51) Int. Cl.
*H04L 9/20* (2006.01)
*H04L 9/34* (2006.01)

(52) U.S. Cl.
USPC .............................................. 380/44; 380/46

(58) Field of Classification Search
None
See application file for complete search history.

(56) References Cited

U.S. PATENT DOCUMENTS

| 7,398,393 | B2* | 7/2008 | Mont et al. | 713/168 |
|---|---|---|---|---|
| 7,869,593 | B2* | 1/2011 | Beeson | 380/30 |
| 8,185,476 | B2* | 5/2012 | Zhu et al. | 705/59 |
| 2005/0015471 | A1* | 1/2005 | Zhang et al. | 709/221 |
| 2007/0104326 | A1* | 5/2007 | Feigenbaum et al. | 713/189 |
| 2008/0022373 | A1* | 1/2008 | Takahashi | 726/4 |
| 2008/0263644 | A1* | 10/2008 | Grinstein | 726/6 |
| 2010/0201489 | A1* | 8/2010 | Griffin | 340/10.1 |

* cited by examiner

*Primary Examiner* — Venkat Perungavoor
(74) *Attorney, Agent, or Firm* — Park, Vaughan, Fleming & Dowler, LLP

(57) ABSTRACT

Some embodiments provide systems and techniques for performing parameterizable cryptography. An encryption key can be determined based at least on a string associated with an authorization policy. The encryption key can then be used to encrypt information. The decryption key can also be determined based at least on the string associated with the authorization policy. Note that the authorization policy must be satisfied to decrypt information. In some embodiments, the systems and techniques for performing parameterizable cryptography are blindable. These blindable embodiments can be used to preserve privacy.

20 Claims, 6 Drawing Sheets

PARAMETERIZABLE CRYPTOGRAPHY

BACKGROUND

1. Technical Field

This disclosure generally relates to information security. More specifically, this disclosure relates to techniques and systems for parameterizable cryptography.

2. Related Art

Organizations commonly encrypt information to protect it from unauthorized accesses. Specifically, encryption can be used to ensure that a user is allowed to access information only if the user satisfies certain conditions. For example, the user may be allowed to access information only if the user proves that the user is above a certain age and that the user has paid for the information.

Due to rapid advances in computing and communication technologies, the ability to collect and exploit private information has grown exponentially. As a result, it has become very important to enable individuals and organizations to protect private information.

Conventional techniques which grant access to protected information usually require large amounts of storage to keep track of keys, and also usually require communication between multiple systems, e.g., between the key generator and the key escrow agent, which can make these techniques vulnerable to attacks. Further, these techniques may reveal private information because they do not enable the user to access a piece of protected content without revealing to the system which piece of protected content the user is accessing.

SUMMARY

Some embodiments of the present invention provide systems and techniques for blindable parameterizable cryptography which can be used to grant access to protected information only if certain conditions are met. Some embodiments of the present invention do not require large amounts of storage to keep track of keys, require very little communication between multiple systems, and protect private information.

Specifically, some embodiments provide a system for determining an encryption key. A system, e.g., a server or a client, can receive an encryption request to encrypt information so that the encrypted information can only be decrypted by a decryption request which satisfies an authorization policy. Next, the system can determine the encryption key based at least on a string associated with the authorization policy. Specifically, in some embodiments, the system can determine the encryption key by hashing a secret with the string associated with the authorization policy.

In some embodiments, the encryption request includes blinded information which was generated by a client. Specifically, a client can blind information to obtain blinded information, and send the blinded information to the server with the encryption request. The server can then use the encryption key to encrypt the blinded information to obtain blinded-and-encrypted information. Next, the server can send the blinded-and-encrypted information to the client, thereby enabling the client to determine the encrypted information by unblinding the blinded-and-encrypted information.

Some embodiments of the present invention provide a system for determining a decryption key. A server can verify whether a decryption request to decrypt encrypted information satisfies an authorization policy associated with the encrypted information. The server can determine the decryption key based at least on a string associated with the authorization policy. If the decryption request satisfies the authorization policy, the server can use the decryption key to perform decryption.

In some embodiments, the server verifies that the decryption request satisfies the authorization policy by requiring the decryption request's requester to prove that the authorization policy is satisfied. In some embodiments, the system can authenticate a user who sent the decryption request, and determine whether the user's profile satisfies the authorization policy.

In some embodiments, the decryption request includes blinded-and-encrypted information which was generated by a client. Specifically, a client can blind encrypted information to obtain blinded-and-encrypted information, and send the blinded-and-encrypted information to the server with the decryption request. The server can then use the decryption key to blindly decrypt the blinded-and-encrypted information to obtain blinded information. Next, the server can send the blinded information to the client, thereby enabling the client to determine the information by unblinding the blinded information.

In some embodiments, the encryption and decryption key is established using the Diffie-Hellman technique, with the public parameter being the modulus p, and the specific key for an authorization policy derived using a secret combined with a string associated with the authorization policy.

In some embodiments, the encryption and decryption keys are RSA keys. Specifically, when using RSA, the base public key is the modulus n, and the public exponent is a function of the string associated with the authorization policy.

In some embodiments, the encryption and decryption keys are IBE (Identity-Based Encryption) keys. Specifically, when using IBE, the base public key can be the domain parameter, the base private key can be the domain secret, and the public key can be generated from the string associated with the authorization policy.

DETAILED DESCRIPTION

Figure 1:
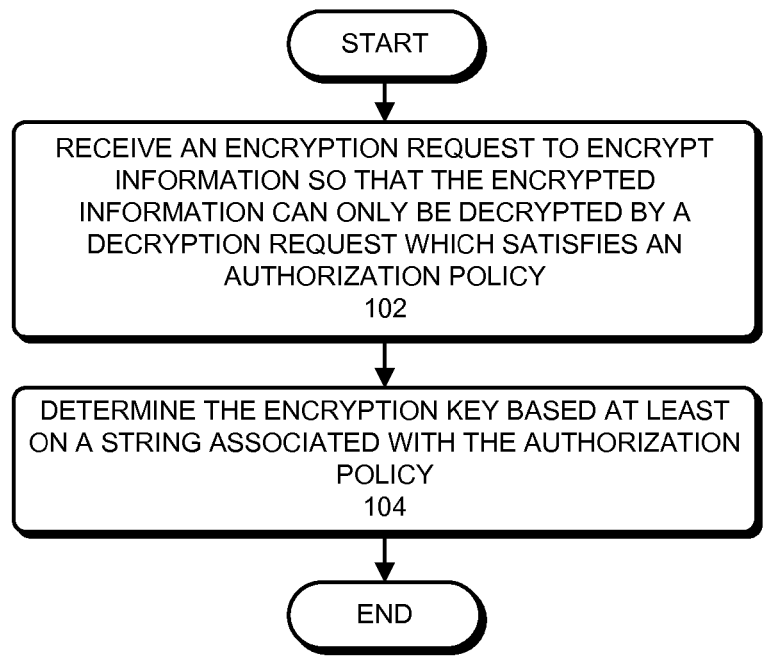
FIG. 1 presents a flowchart which illustrates a process for determining an encryption key which is blindable and parameterizable in accordance with an embodiment of the present invention.

The following description is presented to enable any person skilled in the art to make and use the embodiments.

Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data, so that when a computer system executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

Public Key Cryptography and Certificates

In public key cryptography (also known as asymmetric cryptography), encryption and decryption are accomplished using a key pair: a private key and a public key. A message encrypted using one of the keys can be decrypted using the other key. Note that, although the keys are related, it is computationally impractical to derive one key from the other. Hence, a user can widely distribute the public key without compromising the private key.

Public key cryptography can be used to ensure confidentiality and authenticity. To ensure confidentiality, a sender can encrypt a message using the recipient's public key, and the recipient can decrypt the message using the recipient's private key. To ensure authenticity, a sender can digitally sign the message using the sender's private key, and the recipient can verify the digital signature using the sender's public key.

A certificate is a digitally signed document that certifies that a certain piece of information is true. The entity that issues the certificate is usually called a certificate authority (CA). For example, a CA can issue a certificate to certify that a key pair is associated with a particular user, that the key pair was generated on a particular date, that the key pair was generated by a particular entity, and/or any other information that is desired to be certified. Public key infrastructure (PKI) is a certification system that uses public key cryptography to issue certificates.

Blinded Encryption and Decryption

Blinded encryption and decryption allow device $D_A$ to request decryption from device $D_B$, of a piece of data X which is encrypted with a public key belonging to device $D_B$, without allowing device $D_B$ to see data X. Further details on blinded encryption/decryption can be found in U.S. Pat. No. 7,363,499, entitled "Blinded Encryption and Decryption," by Radia Perlman, issued on 22 Apr. 2008, which is hereby incorporated by reference to describe blinded encryption and decryption.

The following sections briefly describe how blinded encryption and decryption can be performed for Diffie-Hellman, RSA, and Identity-Based Encryption (IBE). In these sections, devices $D_A$ and $D_B$ refer to the two devices which perform the asymmetric encryption and decryption operations.

Diffie-Hellman

Diffie-Hellman is a well-known cryptographic protocol that allows one party to establish a secret key with another party over an insecure communication channel. Further details of Diffie-Hellman can be found in U.S. Pat. No. 4,200,770, entitled "Cryptographic apparatus and method," by inventors Martin E. Hellman, Bailey W. Diffie, Ralph C. Merkle, issued on 29 Apr. 1980. In some embodiments of the present invention, a public key is derived from the domain parameters and a string.

$D_B$'s public key is $g^x$ mod p, $D_B$'s private key is x, and parameters g and p are public. To encrypt M using $D_B$'s public key, a system can choose a random number y, compute $g^y$ mod p, and raise $D_B$'s public key to y to obtain $g^{xy}$ mod p. Next, $g^{xy}$ mod p is used to compute an encryption key (e.g., an Advanced Encryption Standard key) to encrypt M, to obtain $\{M\}g^{xy}$ mod p, where the notation $\{T\}K$ denotes the result of encrypting text T with key K. Since $g^{xy}$ mod p is likely not to fit the form factor of the secret key process being used for encryption, such as AES, $g^{xy}$ mod p must be transformed to fit that form factor, though a function such as a cryptographic hash, or by selecting the needed number of bits for AES by selecting a subset of the bits of $g^{xy}$ mod p. The random number y and the key $g^{xy}$ mod p can be deleted. Next, $D_A$ can be given the encrypted message $\{M\}g^{xy}$ mod p, and the value $g^y$ mod p.

In blinded decryption, $D_A$ obtains the secret key $g^{xy}$ mod p without disclosing the secret key to $D_B$ as follows. $D_A$ chooses a value a, and raises $g^y$ mod p to a, and performs modulo p on the result, to obtain $g^{ya}$ mod p. Next, $D_A$ sends that, along with the identifier i of the particular public key pair, to $D_B$.

$D_B$ applies its $i^{th}$ private key, meaning that it raises $g^{ya}$ mod p to x, and performs a modulo p operation on the result, to obtain $g^{yax}$ mod p. Next, $D_B$ sends this value back to $D_A$. Note that, $D_B$ is unable to determine the secret key $g^{xy}$ mod p, because $D_B$ does not know a.

$D_B$ then raises the value to $a^{-1}$ (the inverse exponent of a, mod p), performs a modulo p operation to obtain $g^{xy}$ mod p, which is the secret key $D_B$ needs to decrypt $\{M\}$ $g^{xy}$ mod p. Note that the above-described technique can be extended to multiple levels of blinding.

RSA

RSA is a well-known asymmetric encryption and decryption technique that is named after the initials of the three authors of the research paper in which it was first described. Further details of RSA can be found in U.S. Pat. No. 4,405,829, entitled "Cryptographic communications system and method," by inventors Ronald L. Rivest, Adi Shamir, and Leonard M. Adleman, issued on 20 Sep. 1983.

Blinded encryption and decryption can be performed for RSA as follows. Device $D_A$ has M encrypted with $D_B$'s RSA public key (e, n). That means $D_A$ has $M^e$ mod n. To retrieve M through blind decryption, $D_A$ chooses a random number, say $R_1$, encrypts $R_1$ with $D_B$'s public key to obtain $R_1^e$ mod n, multiplies that by $M^e$ mod n, and sends the result $R_1^e \cdot M^e$ mod n to $D_B$, along with the identifier of the private key that $D_B$ should use, say "i." In other words, $D_A$ sends the message "$R_1^e \cdot M^e$ mod n, i" to $D_B$. Note that if $D_B$ does not have $R_1$, it will not be able to retrieve M.

Next, $D_B$ operates on $R_1^e \cdot M^e$ mod n with its private key (d, n), which it selects based on the value of "i," to obtain $R_1^{ed} \cdot M^{ed}$ mod n which results in $R_1 \cdot M$ mod n because e and d are inverse exponents, mod n. $D_B$ then sends $R_1 \cdot M$ mod n back to $D_A$.

To perform the unblinding operation, $D_A$ divides message $R_1 \cdot M$ mod n by $R_1$ to obtain M. Note that the above-described technique can be extended to multiple levels of blinding.

Identity-Based Encryption (IBE)

IBE is an asymmetric encryption technique in which the public key for a user can be obtained from a known identity string associated with the user. A trusted third party, called the private key generator (PKG) generates the private key. Further details of IBE can be found in U.S. Pat. No. 7,590,236, entitled "Identity-Based-Encryption System," by Dan Boneh and Xavier Boyen, issued on 15 Sep. 2009, which is hereby incorporated by reference to describe identity-based encryption. Details on IBE can also be found in Dan Boneh, Matthew K. Franklin, "Identity-Based Encryption from the Weil Pairing Advances in Cryptology," Proceedings of CRYPTO 2001 (2001).

Blinding can be performed with IBE by operating on the input with a random number R and operating on the returned output with R's inverse. Some embodiments of the present invention use the operations of IBE, but instead of a third party PKG, the embodiments use the domain parameter as the "base public key," and the base private key is the domain secret.

Blindable Parameterized Cryptography

Some embodiments of the present invention provide techniques and systems for generating a family of key pairs that are blindable and parameterizable using an arbitrary string.

FIG. 1 presents a flowchart which illustrates a process for determining an encryption key which is blindable and parameterizable in accordance with an embodiment of the present invention.

The process can begin by receiving an encryption request to encrypt information so that the encrypted information can only be decrypted by a decryption request which satisfies an authorization policy (block 102). For example, a system may receive the encryption request when an application executing on the system invokes a library function. Alternatively, the system may receive the encryption request when a request message is received from a client over the network.

Next, the system can determine the encryption key based at least on a string associated with the authorization policy (block 104). For example, the string associated with the authorization policy can be "citizen of US and over 21," or "citizen of any country except Monaco, and licensed electrician."

In some embodiments, determining the encryption key can involve hashing a secret with the string associated with the authorization policy. Note that, in these embodiments, the system only needs to store a single secret.

In other embodiments, the system can store an association between authorization policy strings and encryption keys to enable the system to determine an encryption key for an authorization policy string. For example, the system can maintain a table which stores encryption keys which are indexed by the authorization policy string.

Figure 2:
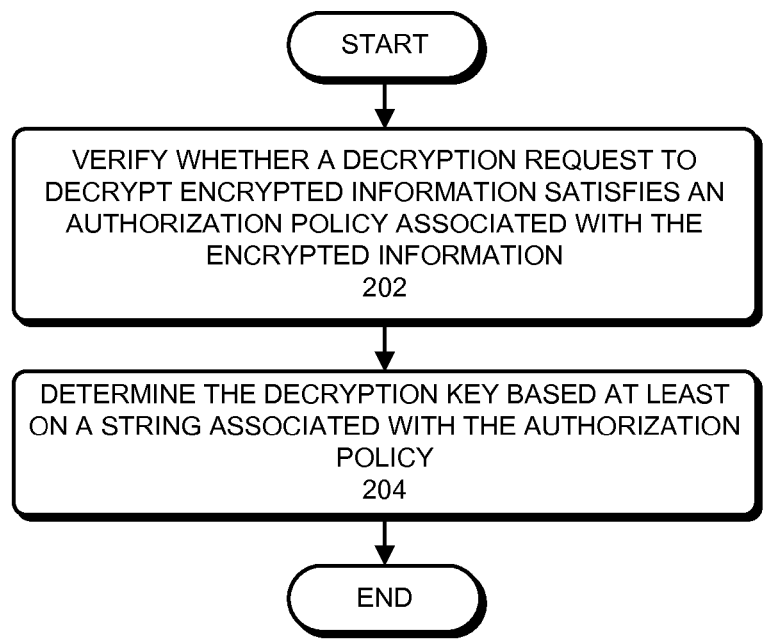
FIG. 2 presents a flowchart which illustrates a process for determining a decryption key which is blindable and parameterizable in accordance with an embodiment of the present invention.

FIG. 2 presents a flowchart which illustrates a process for determining a decryption key which is blindable and parameterizable in accordance with an embodiment of the present invention.

The process can begin by verifying whether a decryption request to decrypt encrypted information satisfies an authorization policy associated with the encrypted information (block 202).

In some embodiments, the system can verify whether the decryption request satisfies the authorization policy by requiring the requester to prove that the authorization policy is satisfied. For example, the requester may provide papers or credentials to prove that the authorization policy is satisfied. In some embodiments, the system can authenticate the user who sent the decryption request, and determine whether the user's profile satisfies the authorization policy. The system may use any authentication technique now known or later developed to authenticate the user. A user's profile can generally include any information that is useful for deciding whether to allow the user to access information. For example, a user's profile may include the user's name, age, and nationality.

Next, the system can determine the decryption key based at least on a string associated with the authorization policy (block 204). If the decryption request satisfies the authorization policy, the system can use the decryption key to decrypt the encrypted information.

In some embodiments, determining the decryption key can involve hashing the string associated with the authorization policy.

In other embodiments, the system can store an association between authorization policy strings and decryption keys to enable the system to determine a decryption key for an authorization policy string. For example, the system can maintain a table which stores decryption keys which are indexed by the authorization policy string.

Figure 3:
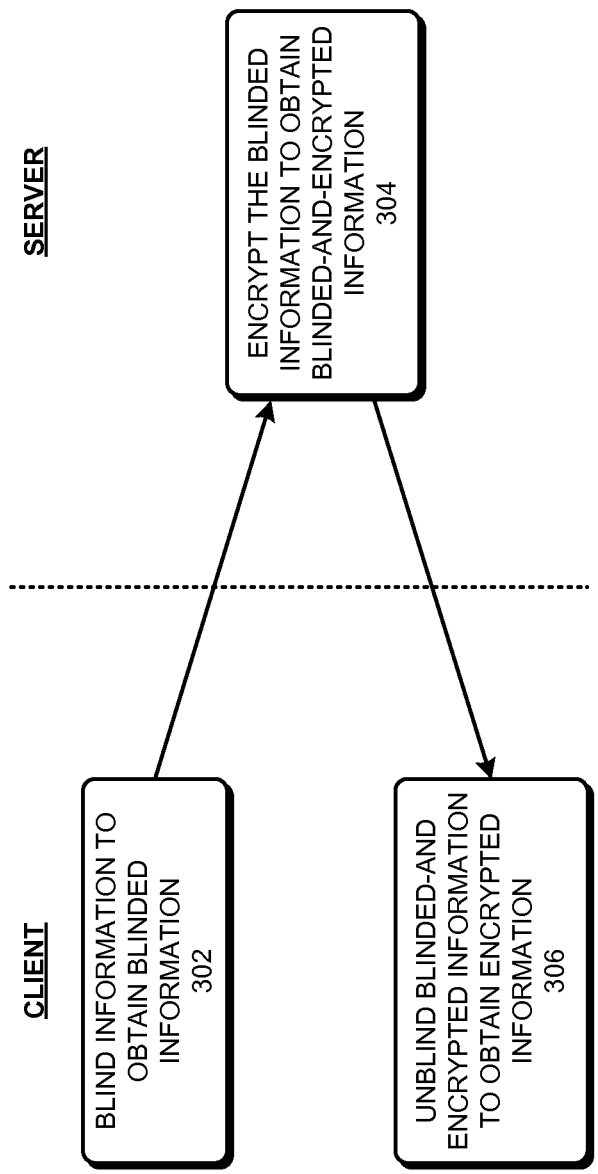
FIG. 3 presents a flowchart which illustrates a process for using a blindable and parameterizable encryption key in accordance with an embodiment of the present invention.

FIG. 3 presents a flowchart which illustrates a process for using a blindable and parameterizable encryption key in accordance with an embodiment of the present invention.

A client can blind information to obtain blinded information (block 302). Next, the client can send the blinded information to the server. The server can then encrypt the blinded information to obtain blinded-and-encrypted information (block 304). As explained above, the server uses a blindable encryption key that is parameterized using the authorization policy string. Next, the server can send the blinded-and-encrypted information to the client. Finally, the client can unblind the blinded-and-encrypted information to obtain encrypted information (block 306).

Figure 4:
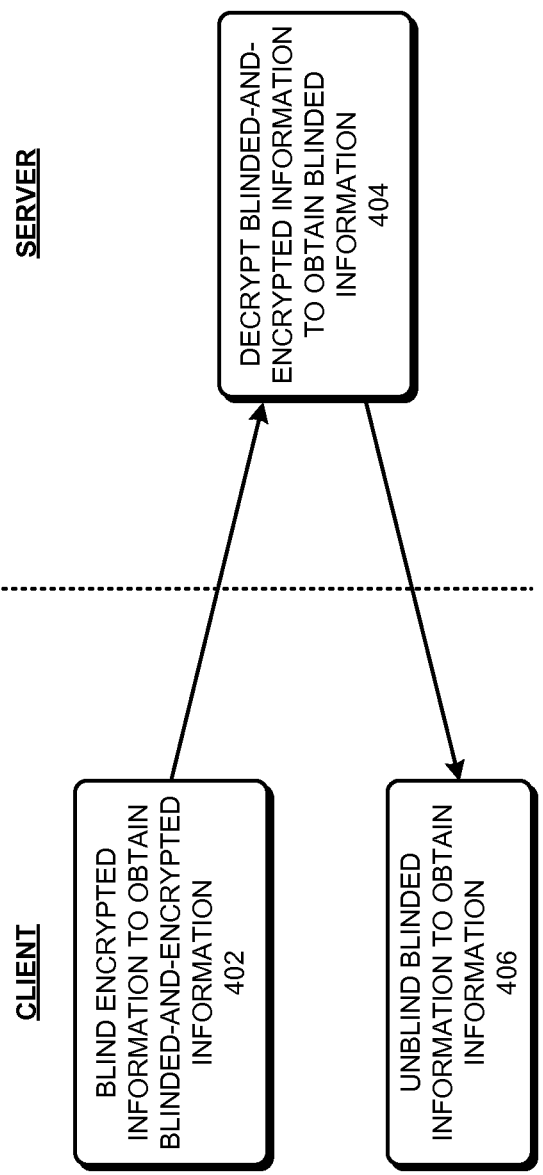
FIG. 4 presents a flowchart which illustrates a process for using a blindable and parameterizable decryption key in accordance with an embodiment of the present invention.

FIG. 4 presents a flowchart which illustrates a process for using a blindable and parameterizable decryption key in accordance with an embodiment of the present invention.

A client can blind encrypted information to obtain blinded-and-encrypted information (block 402). Next, the client can send the blinded-and-encrypted information to the server. The server can then decrypt the blinded-and-encrypted information to obtain blinded information (block 404). As explained above, the server uses a blindable encryption key that is parameterized using the authorization policy string. Next, the server can send the blinded information to the client. Finally, the client can unblind the blinded information to obtain the information (block 406).

Figure 5:
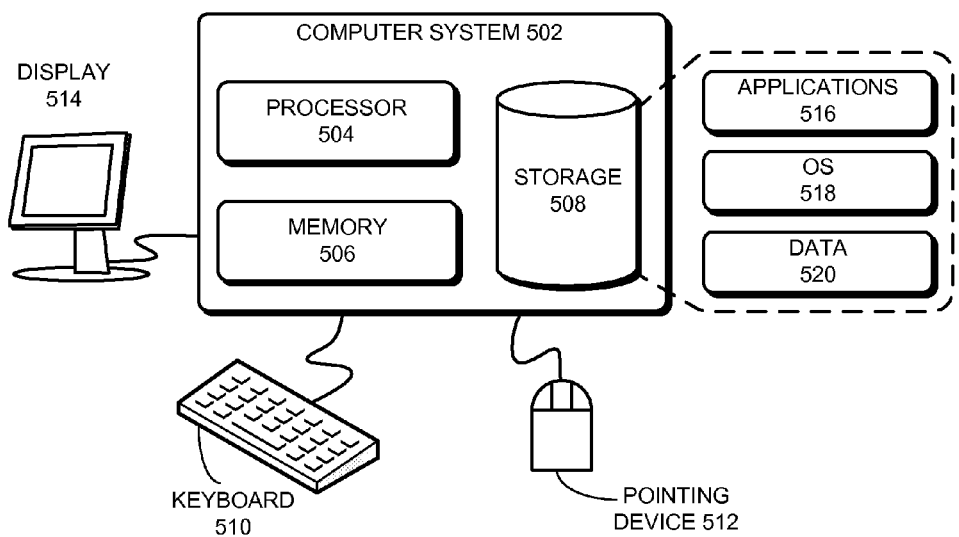
FIG. 5 illustrates a computer system in accordance with an embodiment of the present invention.

FIG. 5 illustrates a computer system in accordance with an embodiment of the present invention.

A computer system can generally be any system that can perform computations. Specifically, a computer system can be a microprocessor, a network processor, a portable computing device, a personal organizer, a device controller, or a computational engine within an appliance, or any other computing system now known or later developed. Computer system 502 comprises processor 504, memory 506, and storage

508. Computer system 502 can be coupled with display 514, keyboard 510, and pointing device 512.

Storage 508 can generally be any device that can store data. Specifically, a storage device can be a magnetic, an optical, a magneto-optical storage device, or it can be based on flash memory and/or battery-backed up memory. Storage 508 can store applications 516, operating system 518, and data 520.

Applications 516 and/or operating system 518 can perform processes to determine and/or use a blindable and parameterizable encryption and/or decryption key. Data 520 can include secrets, seeds, keys, certificates, nonces, and any other information that may be required for performing cryptographic operations.

Figure 6:
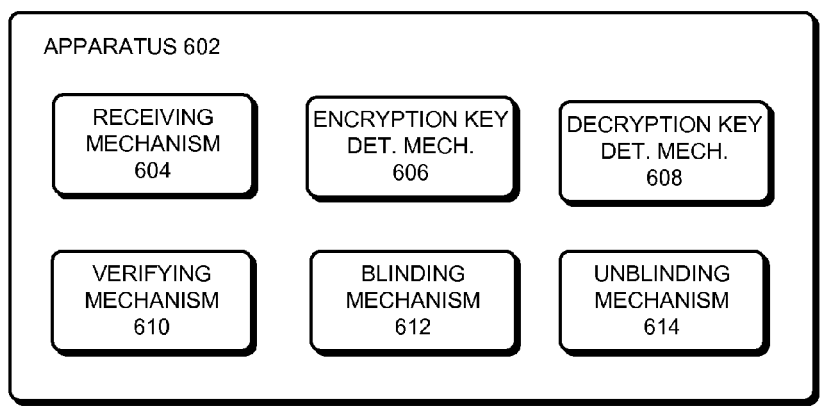
FIG. 6 illustrates an apparatus in accordance with an embodiment of the present invention.

FIG. 6 illustrates an apparatus in accordance with an embodiment of the present invention.

Apparatus 602 can comprise a number of mechanisms which may communicate with one another via a wired or wireless communication channel. Apparatus 602 may be realized using one or more integrated circuits which may be part of one or more processors. Apparatus 602 may be integrated in a computer system, or it may be realized as a separate device which is capable of communicating with other computer systems and/or devices.

Specifically, apparatus 602 can include one or more of the following mechanisms: receiving mechanism 604, encryption key determining mechanism 606, decryption key determining mechanism 608, verifying mechanism 610, blinding mechanism 612, and unblinding mechanism 614.

Receiving mechanism 604 can be configured to receive a decryption request. Encryption key determining mechanism 606 can be configured to determine a blindable and parameterizable encryption key. Decryption key determining mechanism 608 can be configured to determine a blindable and parameterizable decryption key. Verifying mechanism 610 can be configured to verify whether a decryption request satisfies an authorization policy. Blinding mechanism 612 can be configured to blind information. Unblinding mechanism 614 can be configured to unblind information.

Preserving Privacy while Enforcing an Authorization Policy

Figure 7:
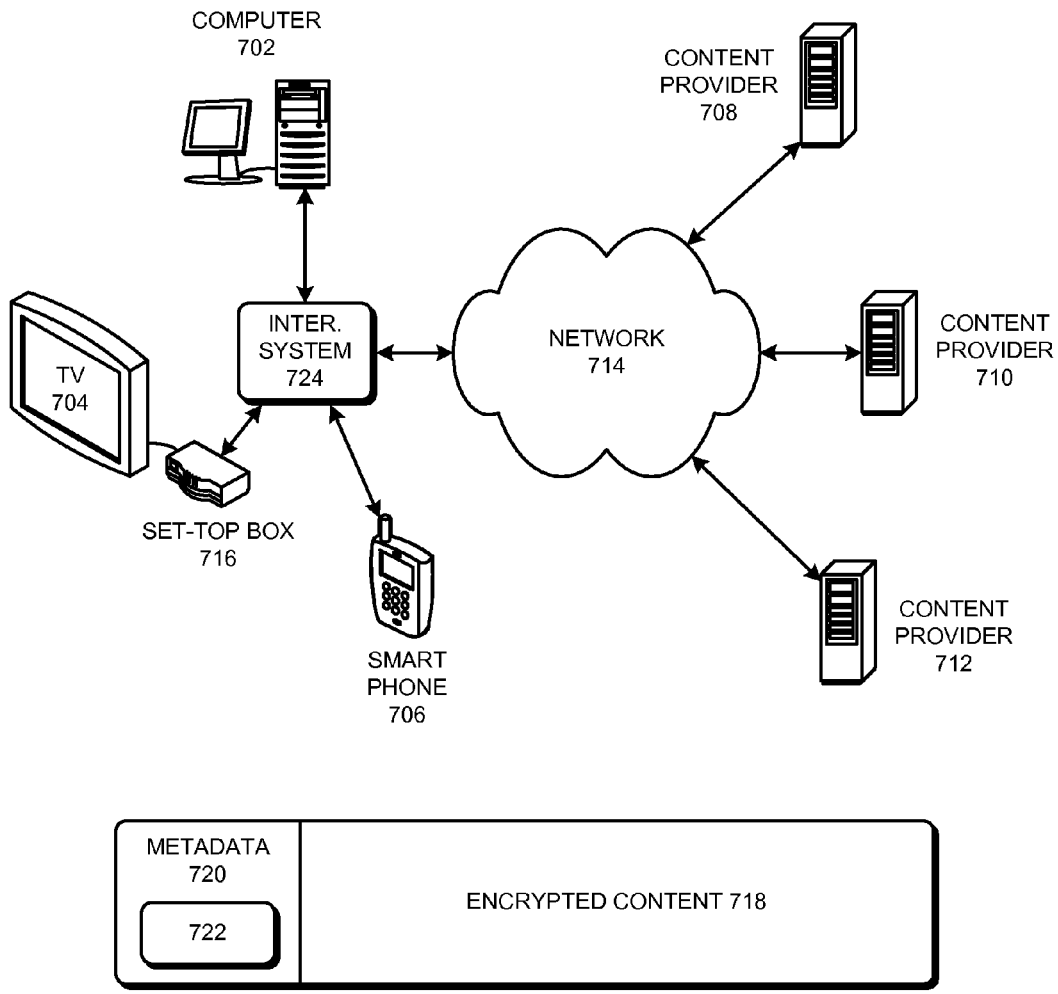
FIG. 7 illustrates how blindable parameterizable cryptography can be used to preserve privacy while enforcing an authorization policy in accordance with an embodiment of the present invention.

FIG. 7 illustrates how blindable parameterizable cryptography can be used to preserve privacy while enforcing an authorization policy in accordance with an embodiment of the present invention.

Content can generally refer to any information that a user desires to consume. A user can consume content using any device that enables the user to consume information. For example, a user can use computer 702, television 704, or smart phone 706 to consume content. Specifically, a user may view a video on television 704; listen to music on smart phone 706; or read a book, view a web page, or play a video game on computer 702.

Content can be obtained from a content provider which can generally be a system or collection of systems which enable a user to obtain content. A content provider may enable a user to consume one or more types of content. For example, a user can obtain content from content providers 708, 710, and 712 via network 714. Content provider 708 can be an online music store which enables users to download or stream music files. Content provider 710 can be a real-time multimedia server which enables users to receive real-time multimedia content, e.g., a video news feed. Content provider 712 can be a gaming server which enables users to play online video games. A content provider can also be a file server which enables a user to access files.

Network 714 can generally include any type of wired or wireless communication channel(s) capable of coupling together computing nodes. This includes, but is not limited to, a local area network, a wide area network, an intranet, the Internet, or a combination of networks.

A content provider may place a device or software at the user's premises to facilitate content consumption. For example, a content provider may require that a user use set-top box 716 to receive video content. Similarly, a content provider may place a proprietary software application on computer 702 or smart phone 706 to facilitate content delivery.

Content can be delivered using many approaches. For example, in one approach, set-top box 716 can receive encrypted content 718 and metadata 720. The encrypted content 718 may be received from content provider 708, or it may be received from a third-party system which distributes encrypted content for content provider 708. Metadata 720 can contain information which can enable set-top box 716 to decrypt the encrypted content. Specifically, metadata 720 can include an authorization policy string.

Once the user satisfies the conditions for consuming the content (e.g., by purchasing the content), set-top box 716 can send encrypted content-key 722 to content provider 708. Next, content provider 708 can decrypt the encrypted content-key 722, and send the content key to set-top box 716, thereby enabling set-top box 716 to decrypt encrypted content 718.

The user may use a device, e.g., a router, to enable devices in the user's network to communicate with the rest of the world. Specifically, some or all communications between a device within a user's network and the outside world may pass through this particular device. For example, in FIG. 7, all communications between set-top box 716 and content provider 708 may pass through intermediate system 724, whereas only some communications (e.g., only data packets) between smart phone 706 and content provider 710 may pass through intermediate system 724.

Intermediate system 724 can preserve privacy by blinding information, e.g., by blinding an encrypted content-key, before forwarding the blinded information to a content provider. A content provider can enforce authorization policies by encrypting and decrypting information using keys that are parameterized based on a string associated with an authorization policy.

For example, when a user attempts to access restricted content, the server can require the user to prove that the user satisfies the authorization policy. In some embodiments, the server can authenticate the user, and verify if the user's profile satisfies the authorization policy specified in the content's metadata. If the user satisfies the authorization policy, the server can decrypt the encrypted content-key by using a key that is derived from the authorization policy string. The user can then use the content key to access the restricted data.

With parameterizable Diffie-Hellman, the server must be actively involved in creation of the encryption key, not only when an item is decrypted, but also when it needs to be encrypted. The parameterizable Diffie-Hellman scheme works with any Diffie-Hellman group, e.g., it works with a multiplicative group of a finite field as described in this disclosure, and it also works with an elliptic curve group over a finite field, although with elliptic curve groups, the "exponentiation" operation is usually referred to as multiplication.

The secret key used in parameterizable Diffie-Hellman is a function of the Diffie-Hellman key $g^{xy}$ mod p, where y is the per-item secret and $g^y$ mod p is stored, associated with the item, and where x is calculated by the server as a function of a secret S known to the server, and the authorization policy string. One method of deriving x is to perform a cryptographic hash of the authorization policy string and S.

To encrypt an item with authorization policy string A, a number y is chosen, $g^y$ is calculated, x is calculated as a function of S and the authorization policy string A, and $g^{xy}$ is used as an encryption key. To decrypt an item with authorization policy string A and metadata $g^y$ without blinding, the server is given $g^y$ and A, the server calculates x from A and S, and raises $g^y$ mod p to x, mod p, to retrieve $g^{xy}$ mod p. With blinding, the client chooses inverse exponents, mod p, of z and $z^{-1}$, raises $g^y$ mod p to z, and presents to the server the string A and $g^{yz}$ mod p. If the requester satisfies the policy expressed in the string A, the server calculates x from S and A, raises $g^{yz}$ to x, and returns $g^{xyz}$ mod p to the client. The client raises $g^{xyz}$ mod p to $z^{-1}$ mod p to compute $g^{xy}$ mod p, which it transforms into the form factor for the secret key encryption process, and uses as the decryption key for the item.

In parameterizable RSA, the public key consists of the modulus n. The specific public key for an authorization policy expressed in string A is obtained by deriving the public exponent from the string A, say by performing h(A). Encryption is done by using the RSA public key ((h(A)), n). The private key is calculated by the server with public modulus n, because the server knows the factorization of n.

To perform blinded decryption in RSA, a client can choose random number R, and compute $R^e \cdot M^e$ mod n, where e=h(A), and M is the message. Next, the client can send $R^e \cdot M^e$ mod n to the server for blinded decryption. The server can raise $R^e \cdot M^e$ mod n to e's exponentiative inverse modulo n, to obtain R·M mod n, and send R·M mod n to the client. The client can divide R·M mod n by R to obtain M.

In IBE, the authorization policy string can be used as the identity string to derive a key which can then be used for encrypting content. Information can be blinded using a blinding function that commutes with the transformations in IBE.

Note that, in traditional blindable cryptography, the blinding function might need to depend on knowing the public key. However, some embodiments of the present invention do not require a client system to know the key associated with an authorization policy string in order to request blind decryption of the content. Instead, the client system just needs to know a public parameter.

Escrow Agent

Blindable parameterizable cryptography can be used by an escrow agent that does not need to keep per-user state, yet is able to have data for each user encrypted and decrypted with a special key for that user. This capability is useful because the escrow agent can enforce that the user is indeed the actual user before being willing to decrypt with its key reserved for that user. Personalized escrow agent keys can be secret keys or public keys.

In the case of secret keys, the escrow agent will need to participate in the encryption as well as decryption. Decryption would consist of the user, say Alice, presenting the encrypted data, along with her name and proof that she is indeed Alice. If the escrow agent is convinced that this is indeed Alice, the escrow agent will decrypt with the "Alice" decryption key.

Encryption would likely not require Alice to authenticate to the escrow agent, even in the case of secret keys, since it might be legal and desirable for another user to be able to encrypt something that Alice will later be able to ask the escrow agent to decrypt.

Figure 8:
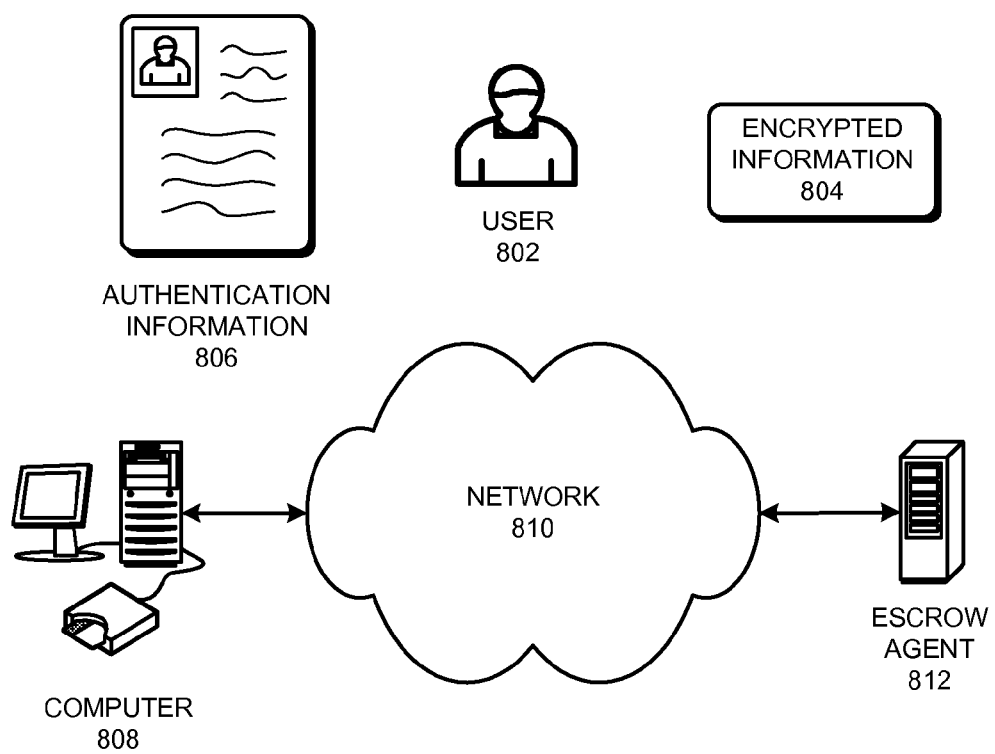
FIG. 8 illustrates how an escrow agent can use blindable parameterizable cryptography to encrypt or decrypt information in accordance with an embodiment of the present invention.

FIG. 8 illustrates how an escrow agent can use blindable parameterizable cryptography to encrypt or decrypt information in accordance with an embodiment of the present invention.

A system can generate encrypted information 804 so that only user 802 can decrypt the information. When user 802 wants to decrypt encrypted information 804, user 802 can present authentication information 806 to escrow agent 812 to prove that user 802 is indeed the actual user. Next, escrow agent 812 can decrypt encrypted information 804 and provide the decrypted information to user 802. Specifically, user 802 can use computer 808 to communicate authentication information 806 and encrypted information 804 to escrow agent 812 over network 810. If user 802 does not want to reveal the decrypted information to escrow agent 812, the system can perform blind decryption, e.g., computer 808 can apply a blinding function to encrypted information 804 before sending it to escrow agent 812, and then apply an unblinding function to the decrypted information when it is received from escrow agent 812.

An example of an application of blindable parameterizable cryptography is the ephemerizer. In conventional ephemerizer schemes, the file system has a set of master "class keys." Files are partitioned into "classes," for instance, by expiration date. All files in the same class are encrypted with the same class key. When the file system backs up the class keys, it "ephemerizes" each one by encrypting with an ephemerizer public key that expires at the same time as the class key is intended to expire. Then, all the ephemerized keys are encrypted one more time with a permanent system administrator secret.

The problem with the conventional scheme is that if the system administrator secret is stolen, the thief who acquires the backup of the class keys (and knows the administrator secret with which that backup has been sealed) can get the ephemerizer to decrypt the class keys. No authentication is required, or even possible, because the ephemerizer protocol involves having the ephemerizer blindly decrypt.

If instead, the ephemerizer key with which the class key is encrypted ("ephemerized") is unique to Alice, then the ephemerizer can verify that the decryption request really comes from Alice. If Alice's long-term secret has been compromised, then that secret can be revoked, e.g., through a PKI, and Alice can be given a new long-term secret. Once the stolen secret is revoked, a thief who has Alice's previous long-term secret will not be able to authenticate as Alice to the ephemerizer, and therefore, the ephemerizer will not decrypt with the "Alice" key. Thus the ephemerizer scheme that uses blindable parameterizable cryptography is more secure.

With unique-to-user escrow agent public keys, decryption requests can be blinded, so the escrow agent need not be trusted to see the data. With unique-to-user secret keys, the escrow agent will need to be involved in both encryption and decryption, and neither operation can be blinded (other than "security through obscurity" such as using secret sharing, or combining the encrypted secret with another quantity stored elsewhere).

The secret key scheme can use derivable keys. For instance, assume the escrow agent knows a single secret "S." The key that the escrow agent uses for Alice is some sort of cryptographic combination of S and the string "Alice," say h(S, "Alice"). To encrypt a quantity X for Alice, a client can securely send the following request to the escrow agent: please encrypt X with a key for Alice. The escrow agent would compute h(S, "Alice") and encrypt X with the result, and return the result to the requester. To decrypt a quantity Y with Alice's key, the client can securely send the following request to the escrow agent: please decrypt Y with "Alice." Additionally, the client can provide authentication data to prove that the request is from Alice. The escrow agent would authenticate Alice (e.g., by finding her public key through a PKI, and using the public key to authenticate the request which was signed with her private key), compute h(S, "Alice"), and use the result to decrypt Y, and return it securely (e.g., encrypted with a session key) to Alice.

The Diffie-Hellman scheme is similar to the one described above using blindable parameterizable Diffie-Hellman keys. In the RSA and IBE based schemes, it is possible for anyone to derive the escrow agent's public key for "Alice." For example, in RSA, the escrow agent's public modulus is "n," and the public exponent for Alice is a function of "Alice," such as h("Alice"), as explained above. IBE involves a domain public key called the "domain parameter" and a "domain secret." A public key for "Alice" is derived using the string "Alice" and the domain parameter. The corresponding private key for the string "Alice" is derivable using the domain secret. In our case, the escrow agent will be the only one that knows the domain secret. In the public key scheme, to encrypt something with the unique-to-Alice escrow agent public key, the client can derive the "Alice" key from the string "Alice." To decrypt, the client can request that the encrypted information should be decrypted using the "Alice" key and also provide authentication data to prove that the request was sent by Alice. All the above public key based schemes are blindable, so the decryption request and its response need not be encrypted using a session key. However, the requester must prove to the escrow agent that it is authorized to decrypt items for the "Alice" key.

In yet another scheme, the keys for each user can be independently generated (instead of being derived) and stored by the escrow agent. The secret key scheme would look the same to the user. Specifically, to encrypt, the client can request that information be encrypted with a key for "Alice." If the escrow agent already has a key for "Alice," it encrypts the information with that key and returns the result. If the escrow agent does not have a key for "Alice," it generates a key K (perhaps by choosing a random number) and stores, in its key database, ("Alice," K). For decryption, the escrow agent authenticates Alice, and looks up key K for Alice, and decrypts with it.

The public key variant of the above scheme would act like the variant above, except for needing to request from the escrow agent creation/lookup of an "Alice" public key pair, and the ability for the client (that wants to encrypt something for Alice) to store the "Alice" public key and/or request lookup of the "Alice" public key.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for determining an encryption key, the method comprising:
receiving an encryption request to encrypt information so that the encrypted information can only be decrypted by a decryption request which satisfies an authorization policy; and
determining the encryption key by combining a secret with a string associated with the authorization policy,
wherein a base public key is at least one of modulus n and a domain parameter, or a base private key is at least one of a factorization of n and a domain secret.

2. The method of claim 1, wherein the encryption request includes blinded information which was generated by a client by blinding the information, and wherein the method further comprises:

using the encryption key to encrypt the blinded information to obtain blinded-and-encrypted information; and
sending the blinded-and-encrypted information to the client, thereby enabling the client to determine the encrypted information by unblinding the blinded-and-encrypted information.

3. The method of claim 1, wherein the encryption key is a Diffie-Hellman key.

4. The method of claim 3, wherein the base public key is modulus p, and wherein the encryption key is determined by cryptographically combining the secret with the string associated with the authorization policy.

5. The method of claim 1, wherein the encryption key is an RSA key.

6. The method of claim 5, wherein the parameterized exponent is derived from the string associated with the authorization policy.

7. The method of claim 1, wherein the encryption key is an IBE (Identity-Based Encryption) key.

8. The method of claim 7, wherein the public key is generated from the string associated with the authorization policy.

9. A computer-executed method for determining a decryption key, the method comprising:
verifying whether a decryption request to decrypt encrypted information satisfies an authorization policy associated with the encrypted information; and
determining the decryption key by combining a secret with a string associated with the authorization policy,
wherein a base public key is at least one of modulus n and a domain parameter, or a base private key is at least one of a factorization of n and a domain secret.

10. The method of claim 9, wherein the decryption request includes blinded-and-encrypted information which was generated by a client by blinding the encrypted information, and wherein the method further comprises:
using the decryption key to decrypt the blinded-and-encrypted information to obtain blinded information; and
sending the blinded information to the client, thereby enabling the client to determine the information by unblinding the blinded information.

11. The method of claim 9, wherein the decryption key is a Diffie-Hellman key.

12. The method of claim 9, wherein the decryption key is an RSA key.

13. The method of claim 9, wherein the decryption key is an IBE (Identity-Based Encryption) key.

14. The method of claim 9, wherein verifying that the decryption request satisfies the authorization policy includes requiring the decryption request's requester to prove that the authorization policy is satisfied.

15. The method of claim 9, wherein verifying that the decryption request satisfies the authorization policy includes:
authenticating a user who sent the decryption request; and
determining whether the user's profile satisfies the authorization policy.

16. A non-transitory computer-readable storage medium storing instructions that when executed by a computer cause the computer to perform a method for determining an encryption key, the method comprising:
receiving an encryption request to encrypt information so that the encrypted information can only be decrypted by a decryption request which satisfies an authorization policy; and
determining the encryption key by combining a secret with a string associated with the authorization policy, wherein a base public key is at least one of modulus n and a domain parameter, or a base private key is at least one of a factorization of n and a domain secret.

17. The computer-readable storage medium of claim 16, wherein the encryption request includes blinded information which was generated by a client by blinding the information, and wherein the method further comprises:
   using the encryption key to encrypt the blinded information to obtain blinded-and-encrypted information; and
   sending the blinded-and-encrypted information to the client, thereby enabling the client to determine the encrypted information by unblinding the blinded-and-encrypted information.

18. The computer-readable storage medium of claim 16, wherein the encryption key is a Diffie-Hellman key.

19. The method of claim 1, wherein the string associated with the authorization policy specifies the authorization policy.

20. The method of claim 19, wherein the encryption request is received at a server, and wherein the secret is known only to the server.

* * * * *